United States Patent
Adams et al.

[11] Patent Number: 5,829,562
[45] Date of Patent: Nov. 3, 1998

[54] DRIVE UNIT

[75] Inventors: Werner Adams, Crailsheim; Peter Edelmann, Heidenheim; Jurgen Friedrich, Crailsheim; Peter Heilinger, Satteldorf; Peter Rose, Ilshofen; Klaus Vogelsang, Crailsheim, all of Germany

[73] Assignee: Voith Turbo GmbH, Germany

[21] Appl. No.: 917,203

[22] Filed: Aug. 25, 1997

Related U.S. Application Data

[63] Continuation of Ser. No. 573,402, Dec. 15, 1995, abandoned.

[30] Foreign Application Priority Data

Dec. 16, 1994 [DE] Germany ............................ 44 45 024.9
Mar. 16, 1995 [DE] Germany ........................ 195 09 417.4

[51] Int. Cl.$^6$ ............................... B60T 1/087; F16D 67/00
[52] U.S. Cl. .......................................... 192/4 B; 192/12 A
[58] Field of Search ................................. 192/4 B, 12 A; 188/274, 291, 296

[56] References Cited

U.S. PATENT DOCUMENTS

| | | | |
|---|---|---|---|
| 1,915,547 | 6/1933 | North et al. | 188/296 |
| 2,170,128 | 8/1939 | De La Mater | 188/296 |
| 2,496,497 | 2/1950 | Russell | 192/12 A |
| 2,827,989 | 3/1958 | Christenson | 192/12 A X |
| 3,124,218 | 3/1964 | Montgomery | 192/4 B |
| 3,291,268 | 12/1966 | Nagel | 192/48 |
| 3,572,480 | 3/1971 | Nagel | 192/4 B |
| 3,631,949 | 1/1972 | Mazalov et al. | 192/4 B |
| 3,650,358 | 3/1972 | Bessiere | 188/296 |
| 3,923,130 | 12/1975 | Eker | 192/4 B X |
| 3,924,713 | 12/1975 | Bessiere | 188/296 |
| 3,951,242 | 4/1976 | Fischer et al. | 188/296 |
| 4,474,270 | 10/1984 | Vogelsang . | |
| 4,630,507 | 12/1986 | Kugler et al. | 192/4 B X |
| 4,836,341 | 6/1989 | Hall | 192/4 B X |
| 5,031,738 | 7/1991 | Okada | 192/4 B |
| 5,193,654 | 3/1993 | Vogelsang . | |
| 5,333,707 | 8/1994 | Kaneda | 188/296 |

FOREIGN PATENT DOCUMENTS

| | | | |
|---|---|---|---|
| 2 260 030 | 8/1975 | France . | |
| 2536805 | 2/1977 | Germany | 192/4 B |
| 3113408 | 10/1982 | Germany . | |
| 4010970 | 10/1991 | Germany . | |
| 4408350 A1 | 10/1994 | Germany . | |
| 62-279159 | 12/1987 | Japan . | |
| 2 056 017 | 3/1981 | United Kingdom . | |

*Primary Examiner*—Rodney H. Bonck
*Attorney, Agent, or Firm*—Baker & Daniels

[57] ABSTRACT

The invention relates to a drive unit for a motor vehicle having a hydrodynamic retarder and a drive train with an engine and a transmission. The hydrodynamic retarder is comprised of a rotor impeller wheel and a stator impeller wheel and is coordinated with the main drive train in a manner such that the rotor impeller wheel of the hydrodynamic retarder is driven by the drive train. The operating fluid of the hydrodynamic retarder is a medium used for cooling the vehicle and a clutch is arranged between the drive train and the hydrodynamic retarder.

17 Claims, 14 Drawing Sheets

DRIVE UNIT

This is a continuation of application Ser. No. 08/573,402, filed Dec. 15, 1995 now abandoned.

BACKGROUND OF THE INVENTION

The invention relates to a drive unit, more specifically, a drive unit having an engine, a transmission and a hydrodynamic retarder.

In drive systems of either vehicles or stationary systems a retarder is frequently integrated as a means for speed or RPM reduction. When used in a motor vehicle or in systems with drastically changing operation, the retarder is turned on and off by filling and emptying the impeller-wheeled working circuit with an operating fluid.

The stationary or mobile units—for example motor vehicles—in which these drive units are installed typically have additional components which require cooling such as motors, brakes, clutches and transmissions.

These additional components may include a cooling circuit to cool their operating medium.

SUMMARY OF THE INVENTION

The objective underlying the invention is to design a drive unit having an engine, transmission and hydrodynamic retarder in such a way that the cooling circuit requirements for the retarder and any additional components is reduced.

The objective is attained by using a cooling medium of the vehicle for the operating fluid of the hydrodynamic retarder.

BRIEF DESCRIPTION OF THE DRAWINGS

The above mentioned and other features and objects of this invention, and the manner of attaining them, will become more apparent and the invention itself will be better understood by reference to the following description of various embodiments of the invention taken in conjunction with the accompanying drawings, wherein.

For clarity, only the transmission and the components required in conjunction with the operating mode are illustrated.

DETAILED DESCRIPTION

Referring to the drawings, there is shown a hydrodynamic retarder 100 integrated in the drive train of a transmission 200, more specifically, in the transmission end housing 1. The hydrodynamic retarder 100 is comprised of a rotor impeller wheel 2 and a stator impeller wheel 3 as well as a rotor impeller wheel housing 4 and a stator impeller wheel housing 5. The rotor impeller wheel is joined to a rotor impeller wheel shaft 6 in a rotationally fixed fashion. The rotor impeller wheel shaft 6 is arranged parallel to a transmission shaft 10 which may function as a transmission input shaft for the vehicle or, as illustrated here, as a transmission output shaft. The rotor impeller wheel 2 is mounted on the rotor impeller wheel shaft 6 in floating fashion. The rotor impeller wheel shaft 6 bears against the transmission housing 1 and the rotor impeller wheel housing 4. The bearing arrangement, comprised of a floating bearing 7 and a fixed bearing 8, is thus contained in the transmission and, therefore, can be supplied with lubricating oil via the transmission oil supply. A floating bearing is a bearing which is axially moveable and which supports only radial forces while a fixed bearing supports both axial and radial loading. The flow of force, or flow of torque, proceeds from the transmission shaft 10 to the rotor impeller wheel shaft 6, which functions as a branch of the drive train. For torque transmission, a gear 11 can be arranged in rotationally fixed fashion on the transmission shaft 10 and a pinion 9 can be located on the rotor impeller wheel shaft 6.

In a braking operation, as illustrated in FIG. 1, the gear and pinion mesh with each other. Thus, torque is transmitted from transmission shaft 10 to rotor impeller wheel shaft 6. The operating fluid of the retarder absorbs heat during braking operations and when that operating fluid is oil a heat exchanger is needed to cool the oil. An oil-water heat exchanger integrated in the cooling system of the vehicle, i.e., the heat exchanger 12, is used to cool the oil and connects, on the water side, to the vehicle radiator 13 while the oil side of the heat exchanger is hooked to the inlet and outlet ducts of the stator impeller wheel 3.

Figure 1A:
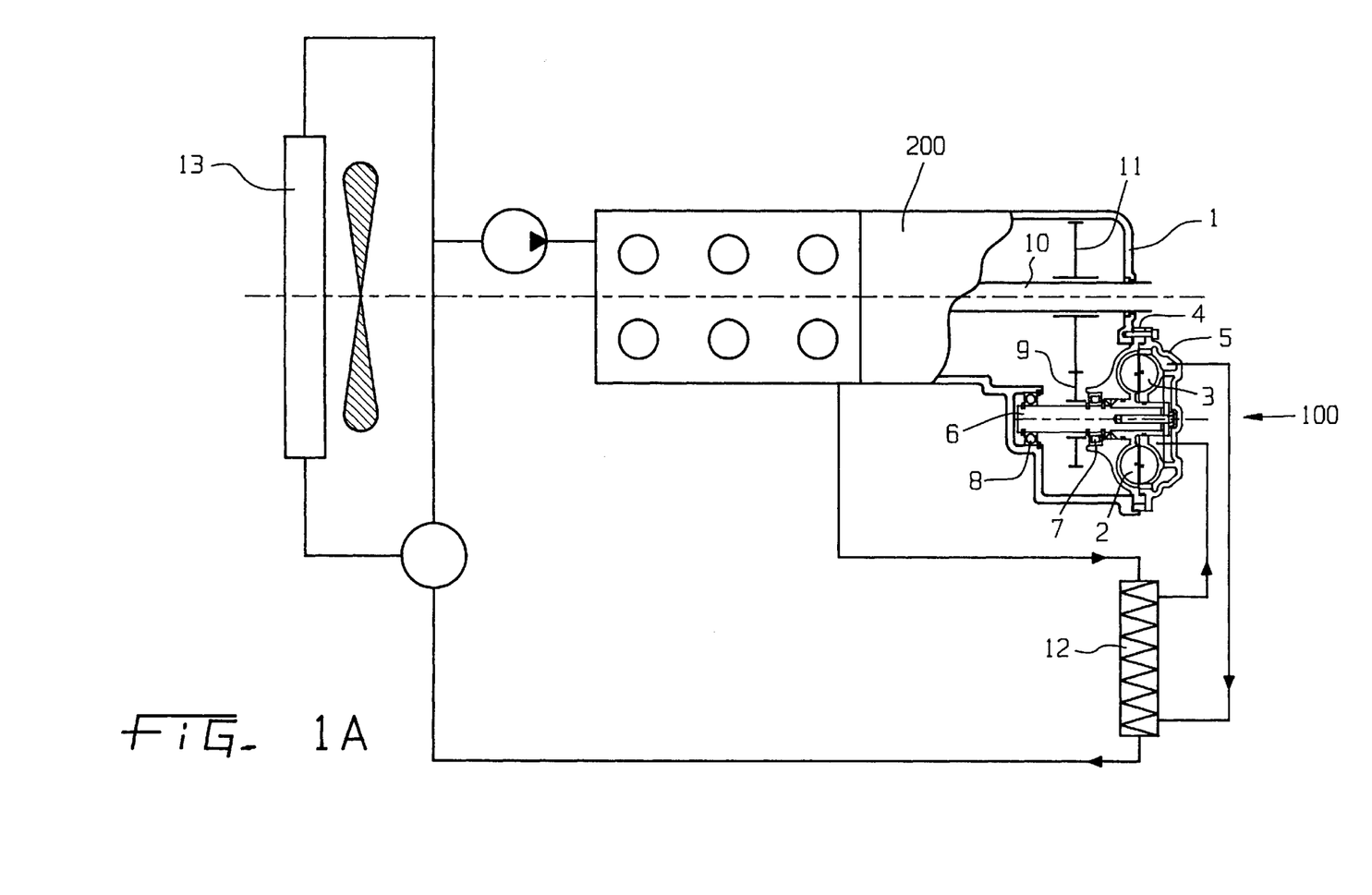
FIGS. 1a–1c are schematic illustrations of a preferred embodiment with a retarder integrated in the transmission in various states of operation.
Figure 1B:
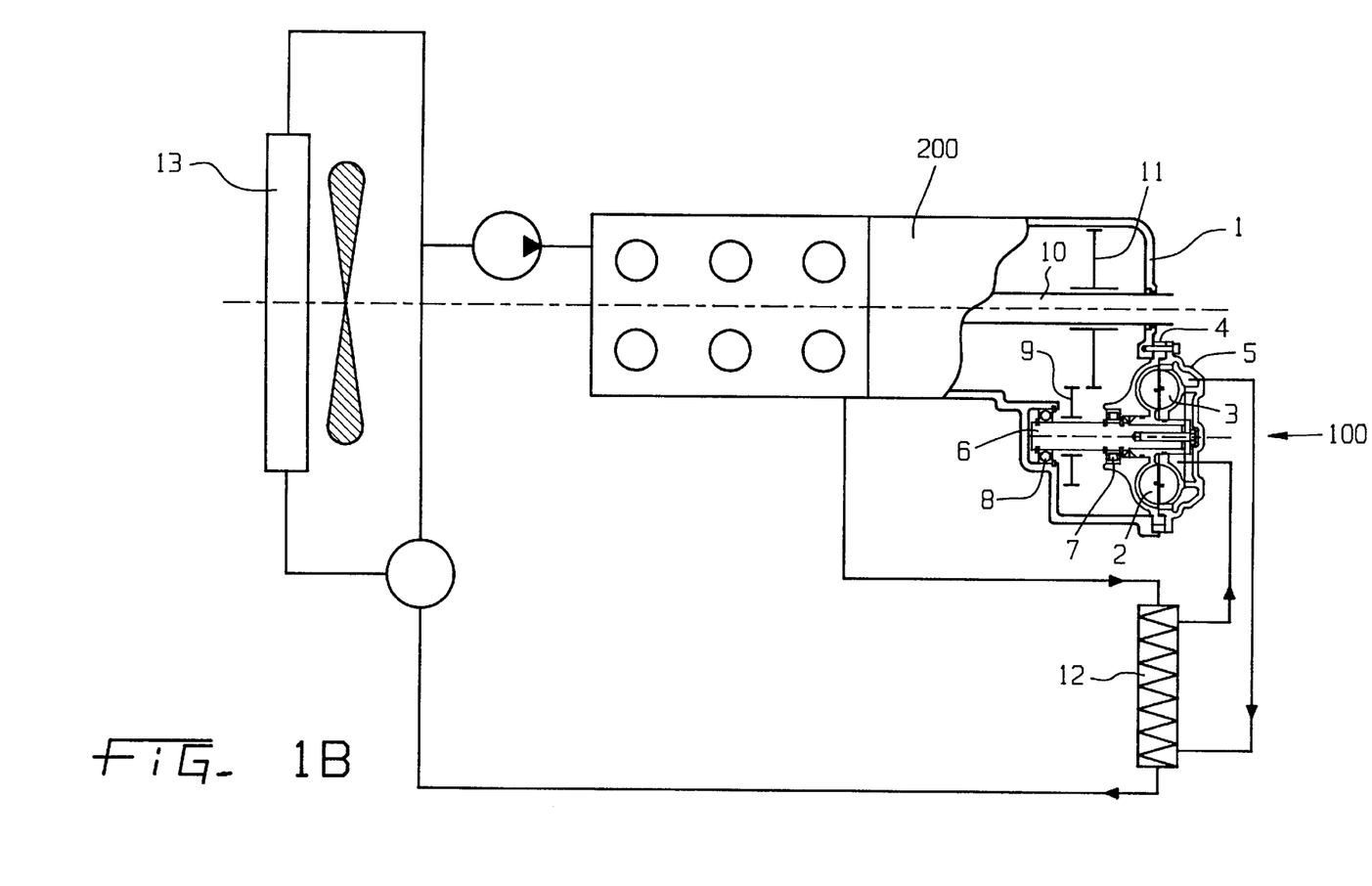
Figure 1C:
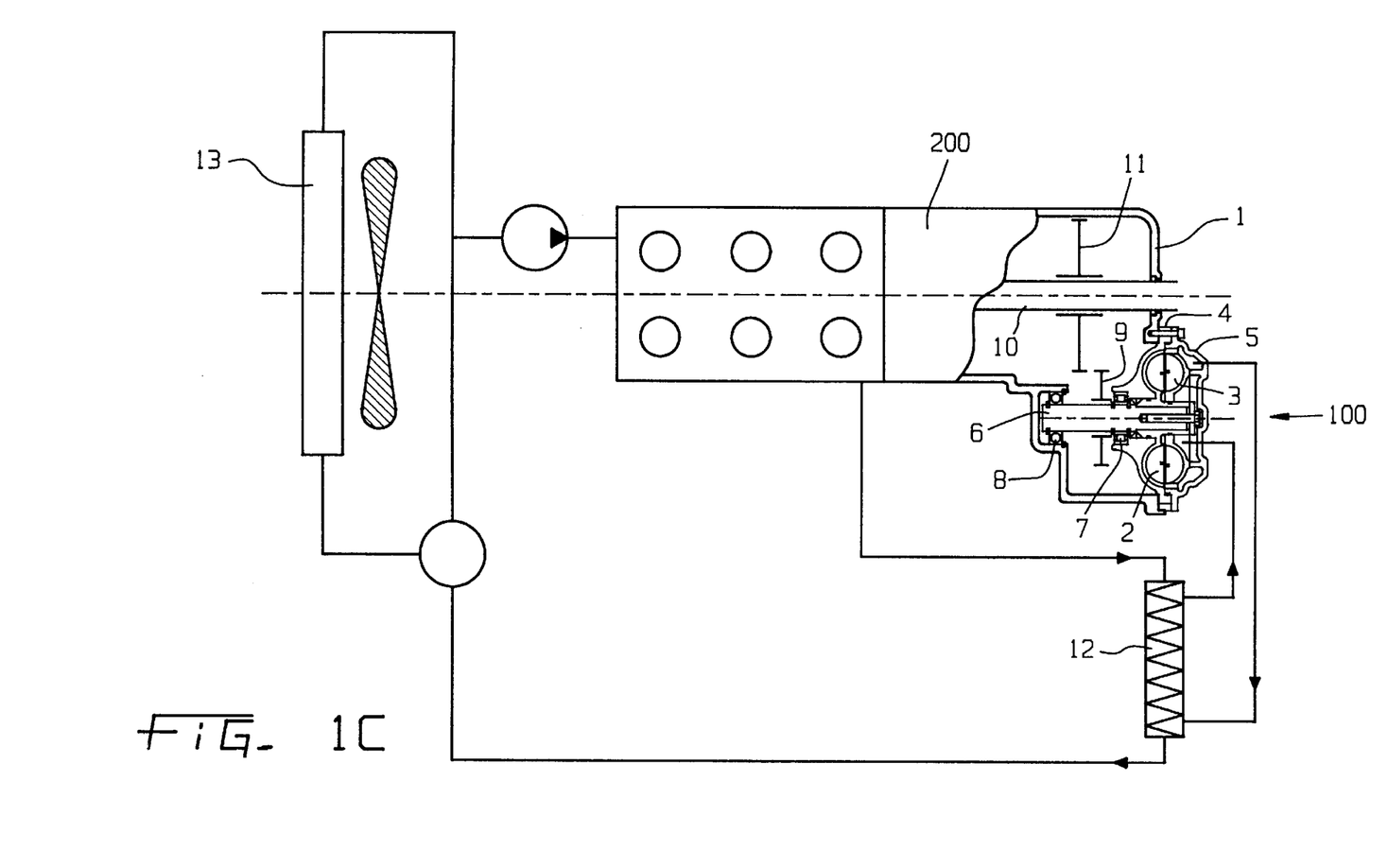

FIG. 1b illustrates the arrangement shown in FIG. 1a but with the retarder idling, i.e., in nonbraking operation. The uncoupling of the rotor impeller wheel shaft from transmission shaft 10 is realized by disengagement of pinion 9. To that end, the pinion 9 may be arranged, rotationally fixed, on a splined shaft that encloses the rotor impeller wheel shaft 6 and slides axially on it. FIG. 1c illustrates another option for realizing an uncoupling of rotor impeller wheel shaft 6 from transmission shaft 10 utilizing the basic structure of FIG. 1a. In the case illustrated in FIG. 1c, the pinion 9 remains unchanged in its position on the rotor impeller wheel shaft 6 and the gear 11 disengages from the pinion 9.

There are also numerous other options for the arrangement and manner of mounting the pinion and gear but these are design measures familiar to the expert, for which reason they are not addressed here in detail.

Figure 2:
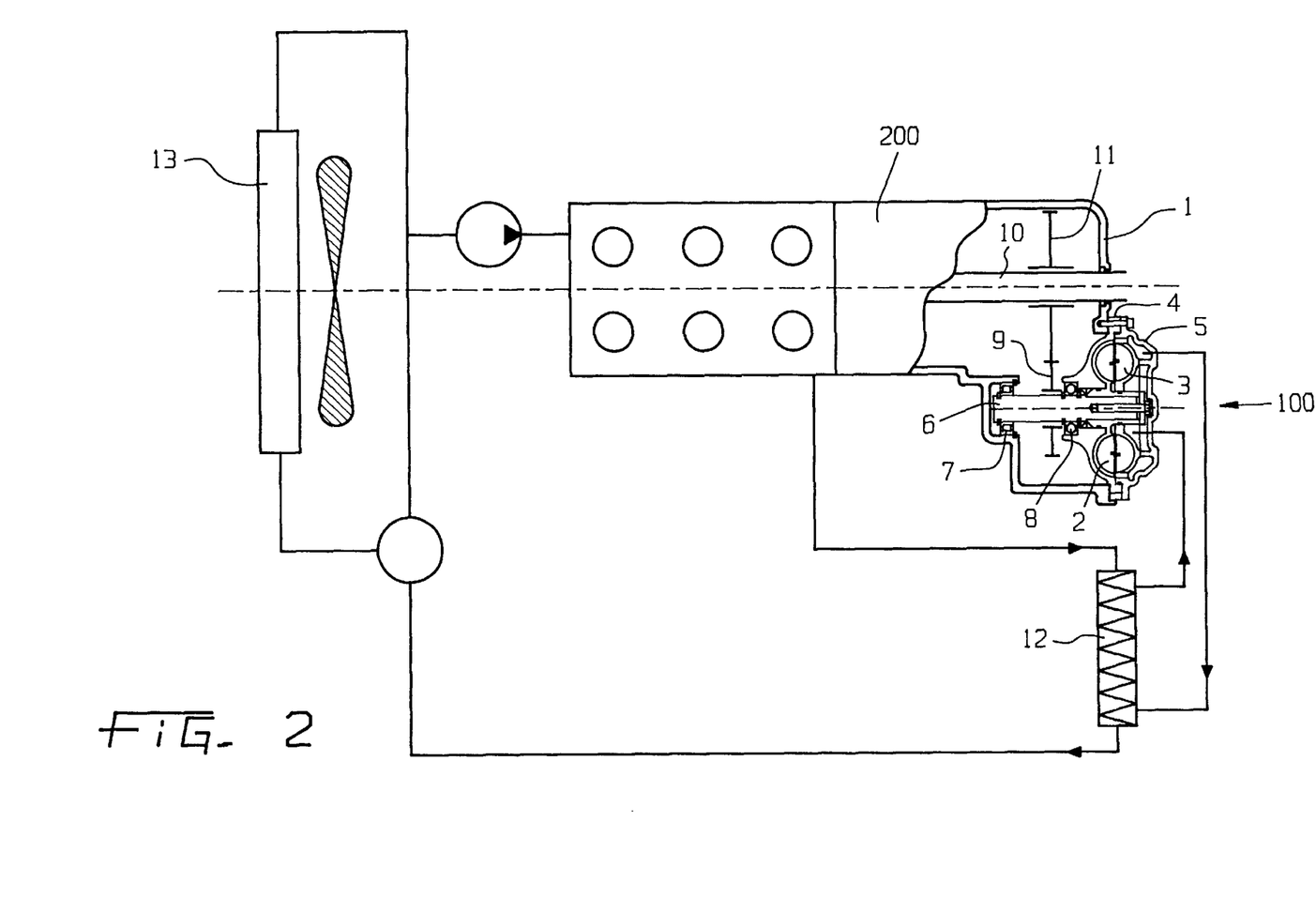
FIG. 2 is a schematic illustration of an arrangement corresponding to FIG. 1 during a braking operation and with the bearings switched.

FIG. 2 shows an arrangement similar to FIG. 1, illustrated here in braking operation, with the individual mounting bearings of rotor impeller wheel shaft 6 switched. The rotor impeller wheel shaft bears via floating bearing 7 on transmission housing 1 and via fixed bearing 8 on rotor impeller wheel housing 4, with the rotor impeller wheel housing, in turn, bearing on the transmission housing.

Figure 3A:
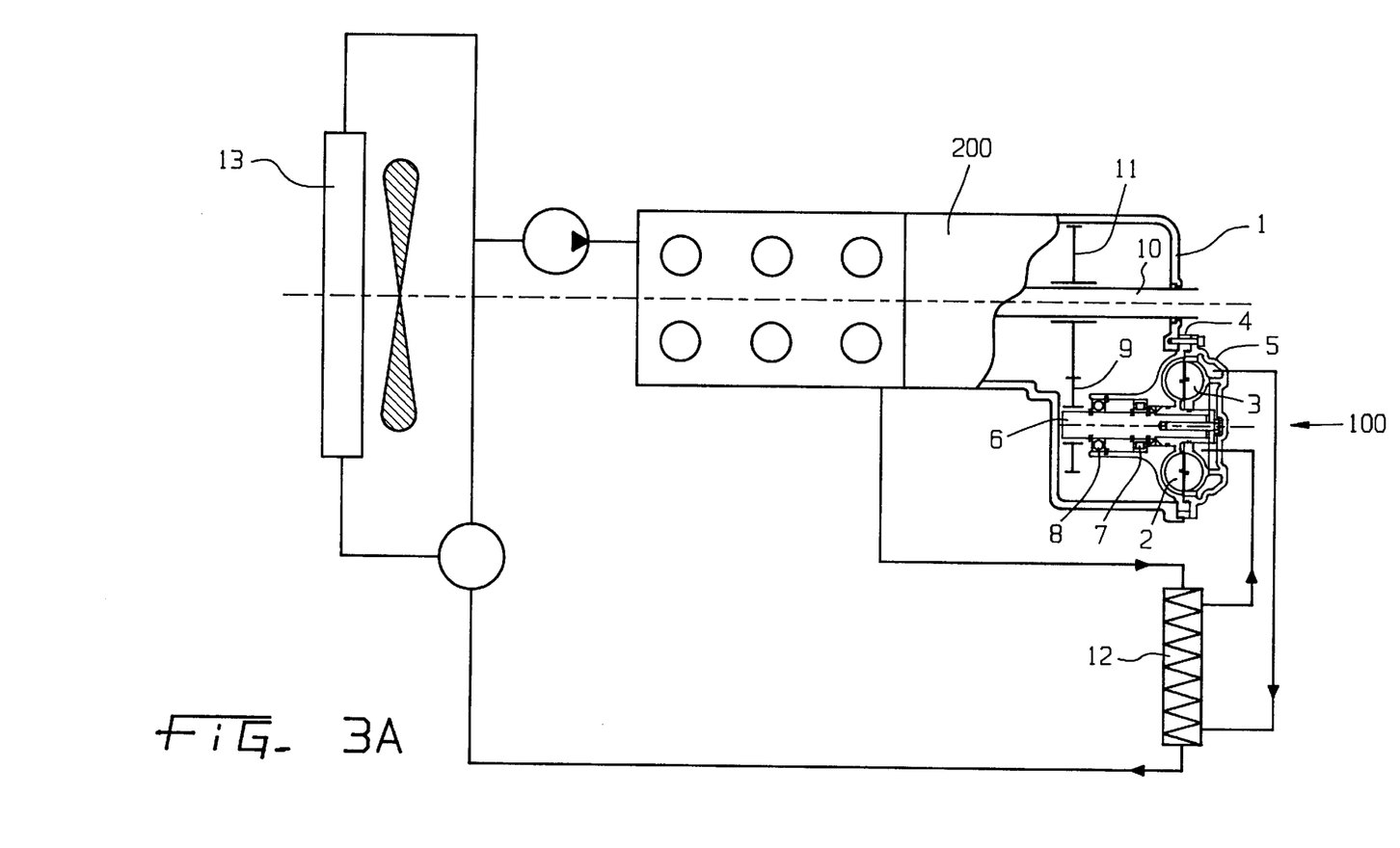
FIGS. 3a–3b are schematic illustrations of an embodiment corresponding to FIG. 1 with a pinion mounted on the rotor impeller wheel shaft in floating fashion and arranged on the transmission side.

FIG. 3a shows an arrangement similar to FIG. 1a in a braking operation where the pinion 9 arranged on rotor impeller wheel shaft 6 is mounted in floating fashion. Either pinion 9 or gear 11 can be used to uncouple the shaft.

Figure 3B:
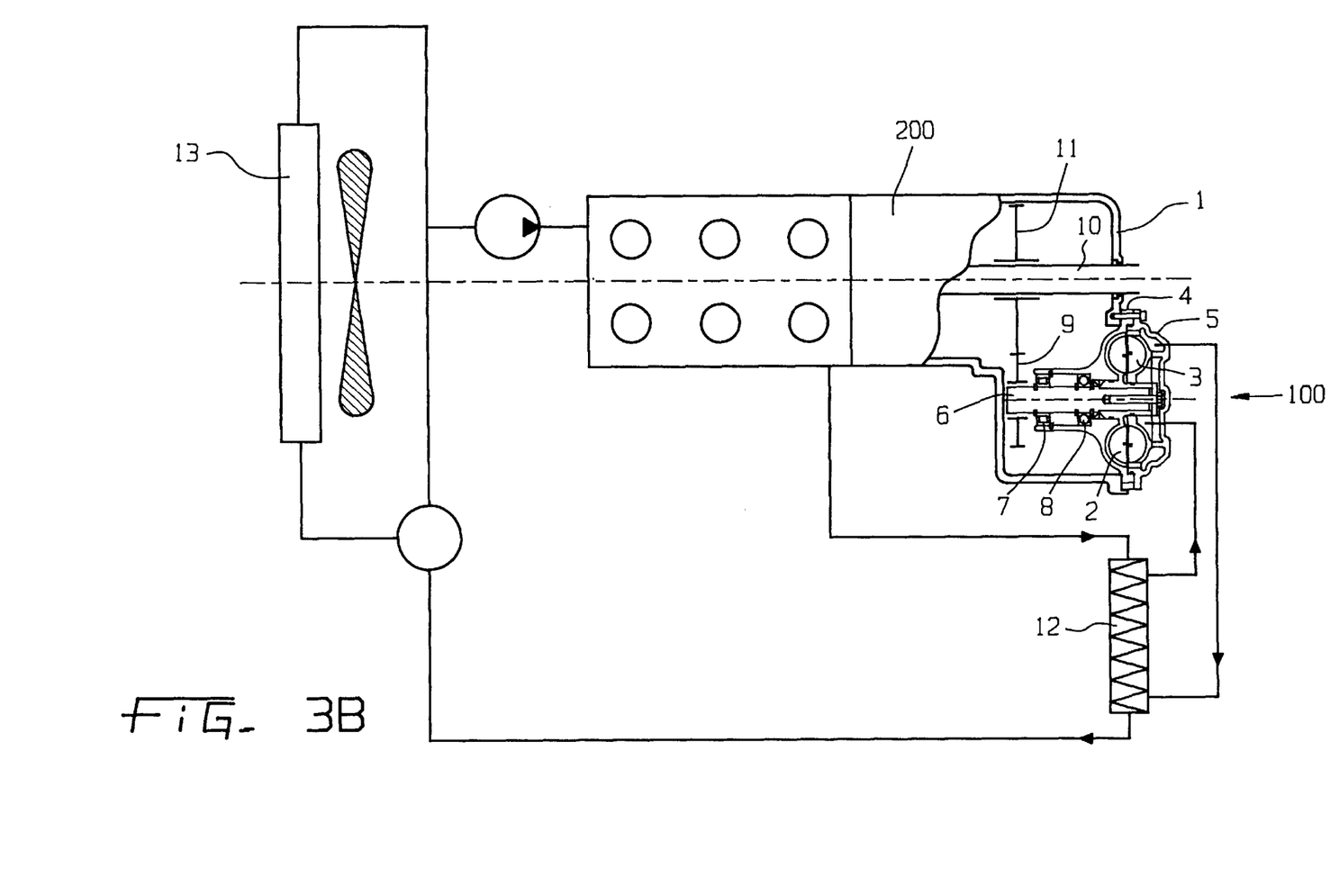

FIG. 3b illustrates an embodiment similar to FIG. 3a, but with mounting bearings 7 and 8 for the rotor impeller wheel shaft switched. The rotor impeller wheel shaft 6 bears via rotor impeller wheel housing 4 on transmission end housing 1. Uncoupling can be provided by either the pinion 9 or gear 11.

Figure 4:
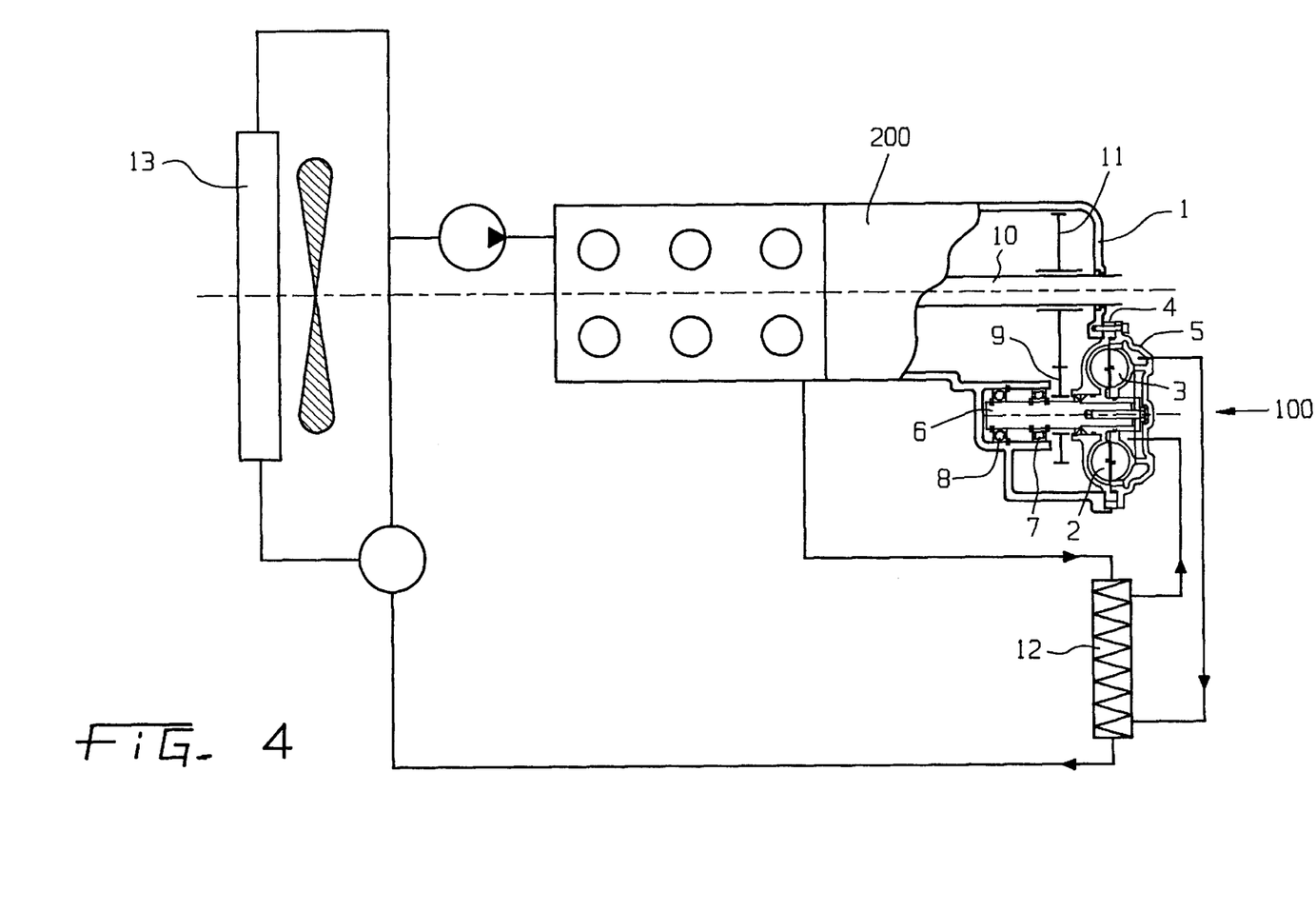
FIG. 4 is a schematic illustration of an embodiment corresponding to FIG. 1 with the pinion mounted on the rotor impeller wheel shaft in floating fashion and arranged on the retarder side.

FIG. 4 shows an embodiment with a hydrodynamic retarder integrated in the transmission. The rotor impeller wheel shaft 6 can be uncoupled from transmission shaft 10 and, when coupled, torque is transmitted from transmission shaft 10 via gear 11 to the pinion. The pinion may be joined in rotationally fixed fashion to the rotor impeller wheel shaft and is arranged on the output side of the transmission. Pinion 9 is shown in FIG. 4 arranged in floating fashion on the retarder side of rotor impeller wheel shaft 6. Although not shown, the invention can also take the form of an embodiment similar to that illustrated in FIG. 4 but wherein the mounting bearings of the impeller wheel shaft 6 have been switched.

Figure 5:
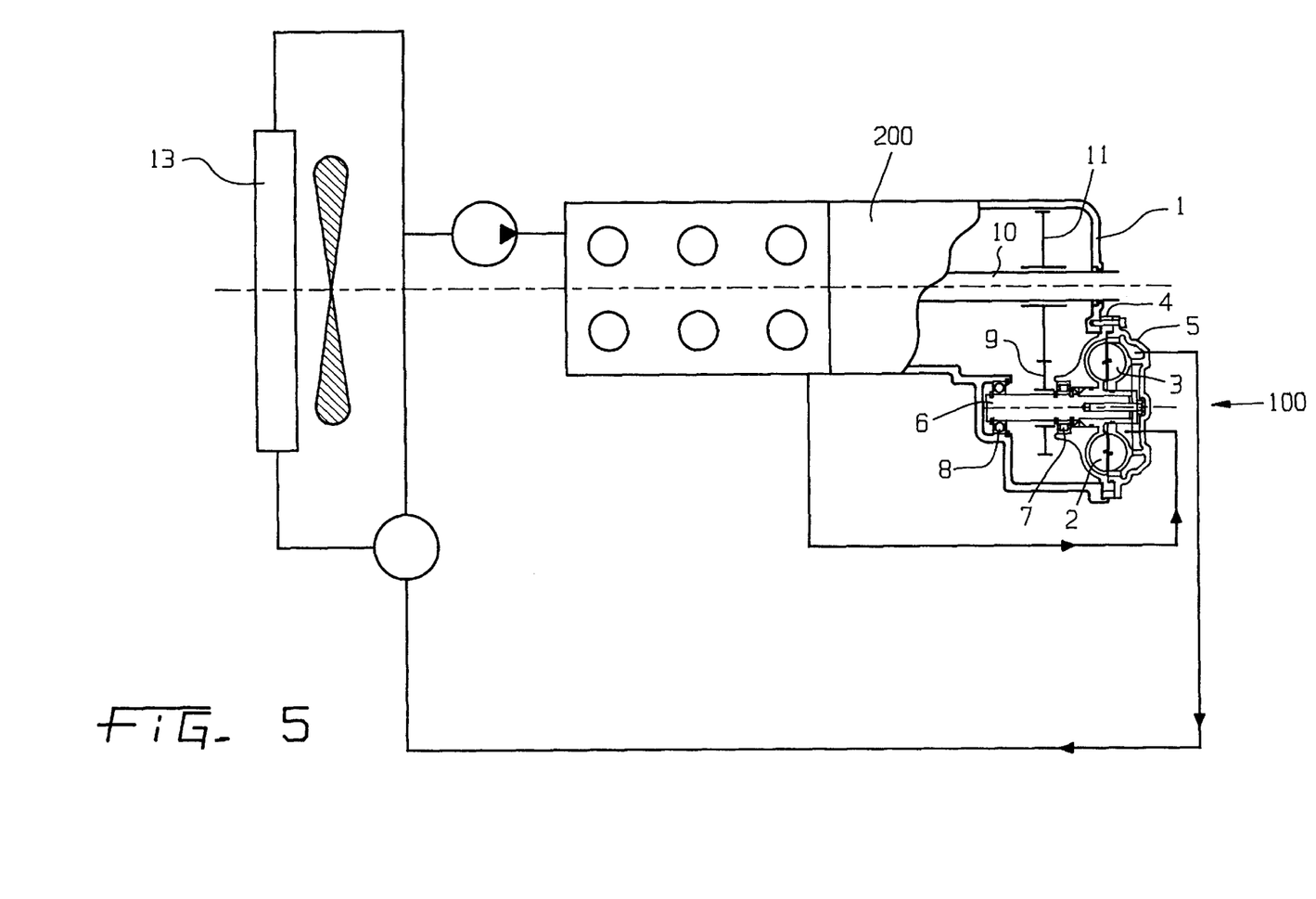
FIG. 5 is a schematic illustration of an embodiment with the retarder integrated in the transmission.

FIG. 5 shows an embodiment of the present invention with a hydrodynamic retarder 100 integrated in the transmission housing and operated, single-flow or multiple-flow, by the cooling medium of the vehicle. The retarder 100 is comprised of a rotor impeller wheel 2, stator impeller wheel 3, rotor impeller wheel housing 4, stator impeller wheel housing 5 and rotor impeller wheel shaft 6. The rotor impeller wheel 2 is mounted in floating fashion on the rotor impeller wheel shaft 6. The rotor impeller wheel utilizes a mounting arrangement comprised of floating bearing 7 and fixed bearing 8. The impeller wheel thus bears via fixed bearing 8 of rotor impeller wheel shaft 6 on transmission housing 1 and via floating bearing 7 on rotor impeller wheel housing 4 and thereby on transmission housing 1. The retarder is mounted within the transmission and can therefore be supplied with lubricating oil from the transmission oil supply.

The rotor impeller wheel shaft 6 is arranged parallel to a transmission shaft 10 which may comprise the transmission output shaft. Torque is transmitted from transmission shaft 10 to rotor impeller wheel shaft 6 by a gear which is rotationally fixed to transmission shaft 10 and which cooperates with a pinion 9 which is rotationally fixed to rotor impeller wheel shaft 6. The gear and pinion mesh with one another during braking operations and, during nonbraking operations, the rotor impeller wheel shaft may be uncoupled from transmission shaft 10 either by uncoupling pinion 9 from gear 11 or uncoupling gear 11 from pinion 9. When uncoupled the retarder is inactive and the rotor impeller wheel does not rotate.

The hydrodynamic retarder illustrated in FIG. 5 is a water retarder and can therefore be directly incorporated in the vehicle cooling system to exchange energy during braking operations. More specifically, the inlet and outlet ducts of the retarder-stator impeller wheel 3 are joined to the vehicle radiator, or engine outlet and the operating fluid of the retarder, e.g., water, is cooled by means of radiator 13. As seen in FIGS. 5–10, the hydrodynamic retarder may be arranged in series with the engine in the engine coolant circuit.

Figure 6:
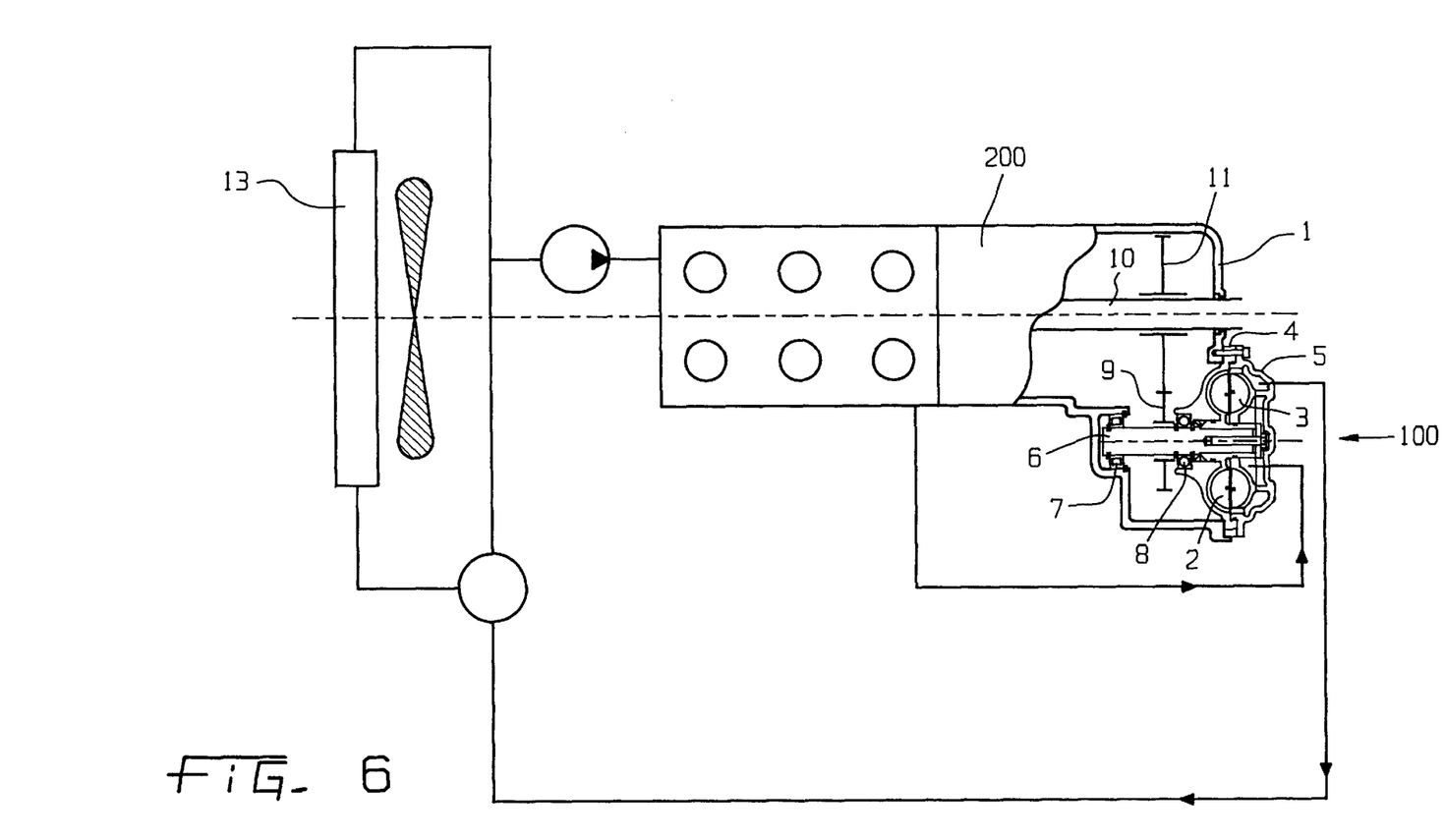
FIG. 6 is a schematic illustration of an embodiment corresponding to FIG. 5 with the bearings switched.

FIG. 6 illustrates an embodiment similar to FIG. 5 wherein the bearings of the mounting arrangement are switched. Thus, the rotor impeller wheel shaft 6 bears on the transmission housing via floating bearing 7 and on the rotor impeller wheel housing by means of fixed bearing 8.

Figure 7:
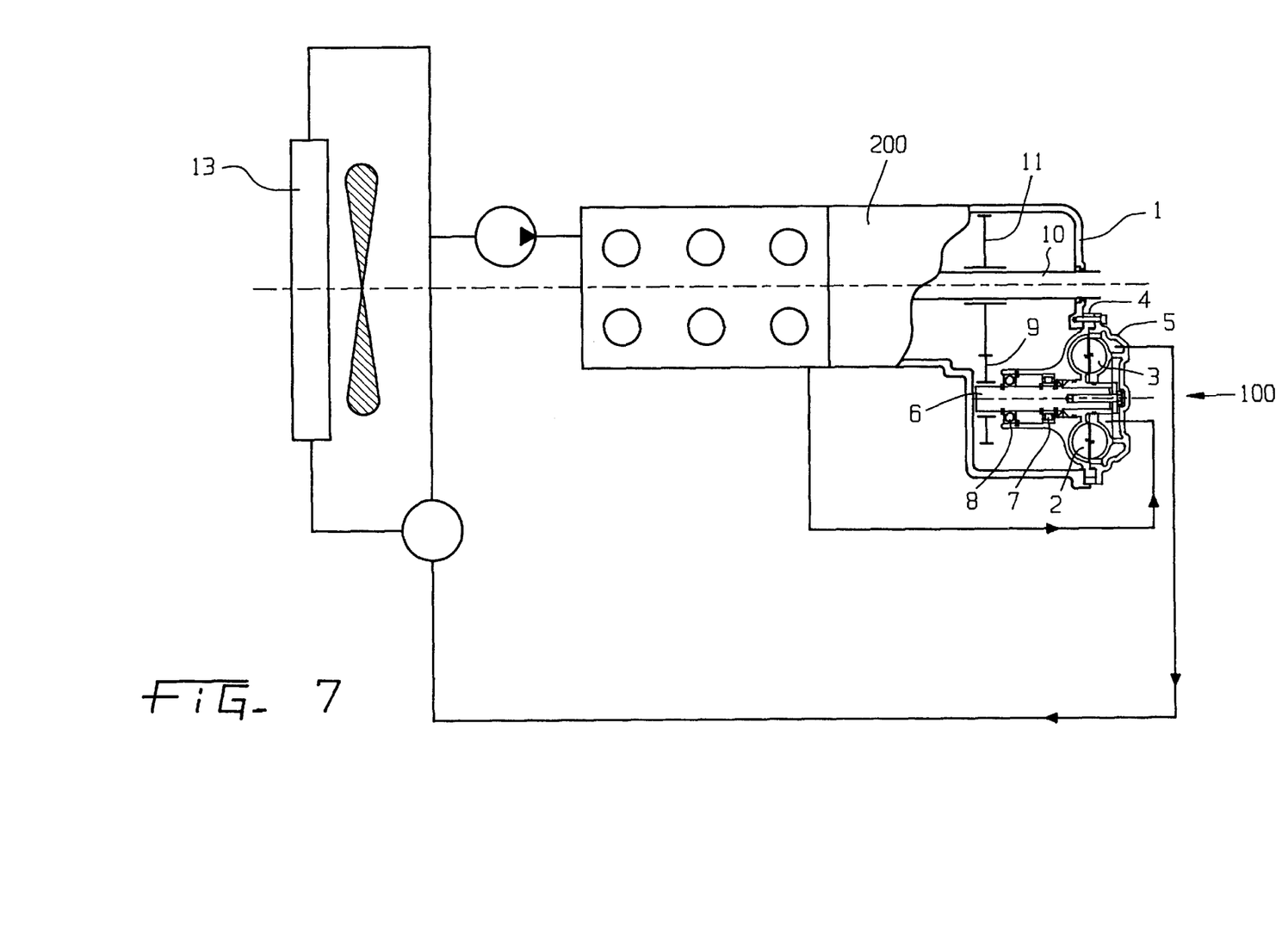
FIG. 7 is a schematic illustration of an embodiment with the retarder integrated in the transmission and the pinion mounted in floating fashion on the rotor impeller wheel shaft and arranged on the transmission side.
Figure 8:
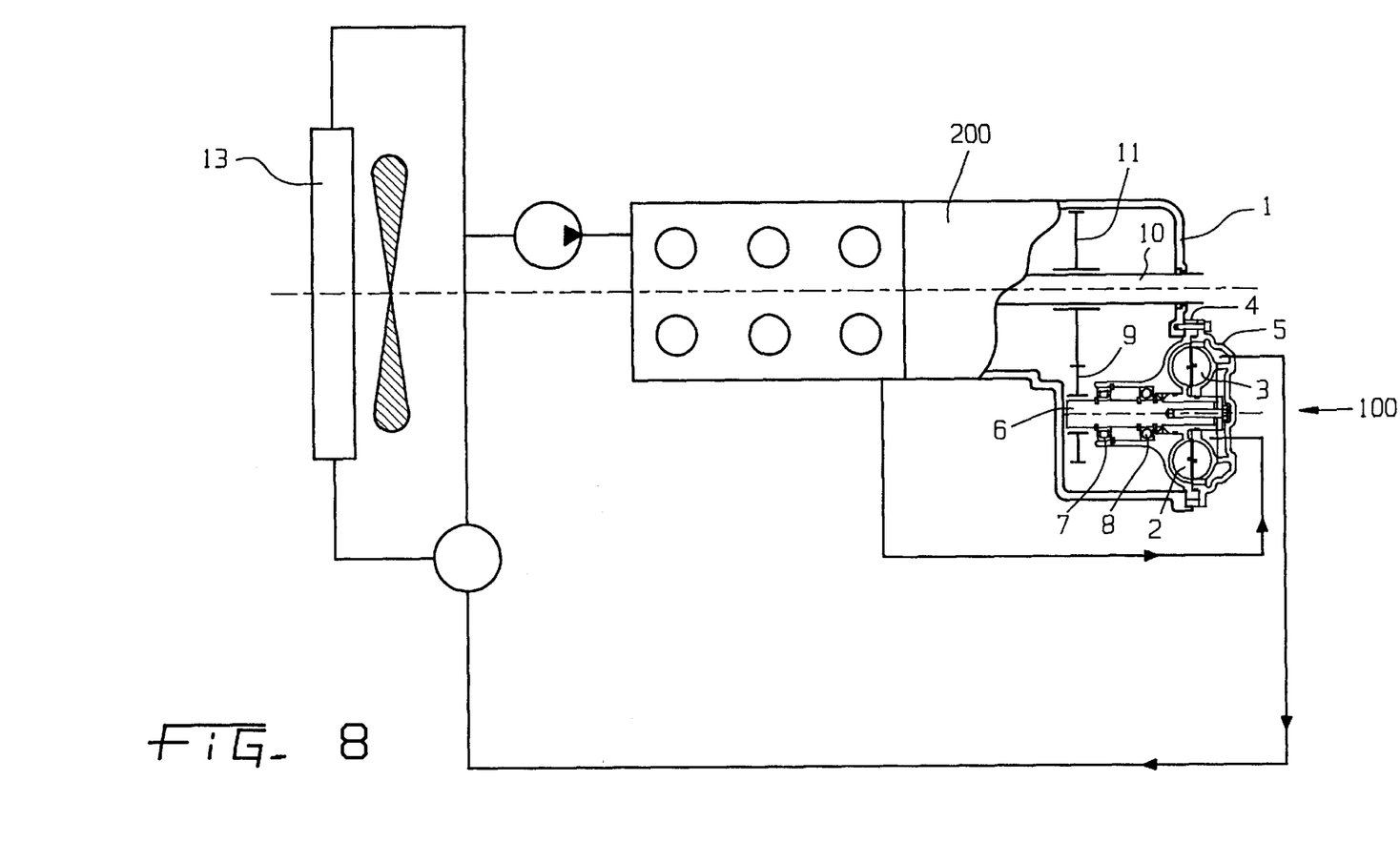
FIG. 8 is a schematic illustration of an embodiment corresponding to FIG. 7 with switched bearings.

FIG. 7 shows an embodiment similar to FIG. 5 wherein pinion 9 is mounted in floating fashion on rotor impeller wheel shaft 6, on the transmission side. FIG. 8 illustrates an arrangement similar to FIG. 7 wherein the bearings 7 and 8 have been switched.

Figure 9A:
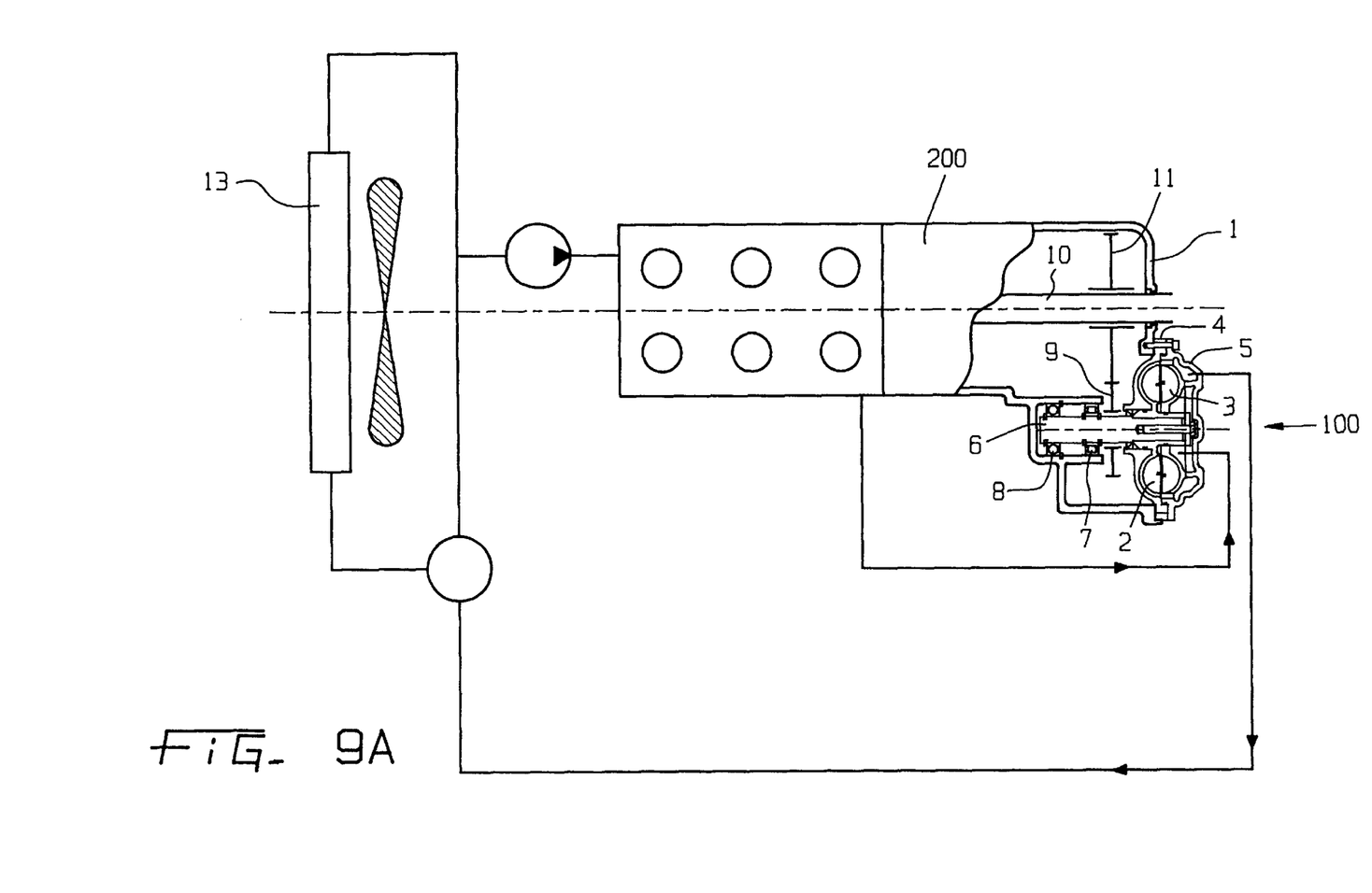
FIGS. 9a and 9b are schematic illustrations of embodiments with the retarder integrated in the transmission and the pinion mounted in floating fashion on the rotor impeller wheel shaft and arranged on the retarder side.
Figure 9B:
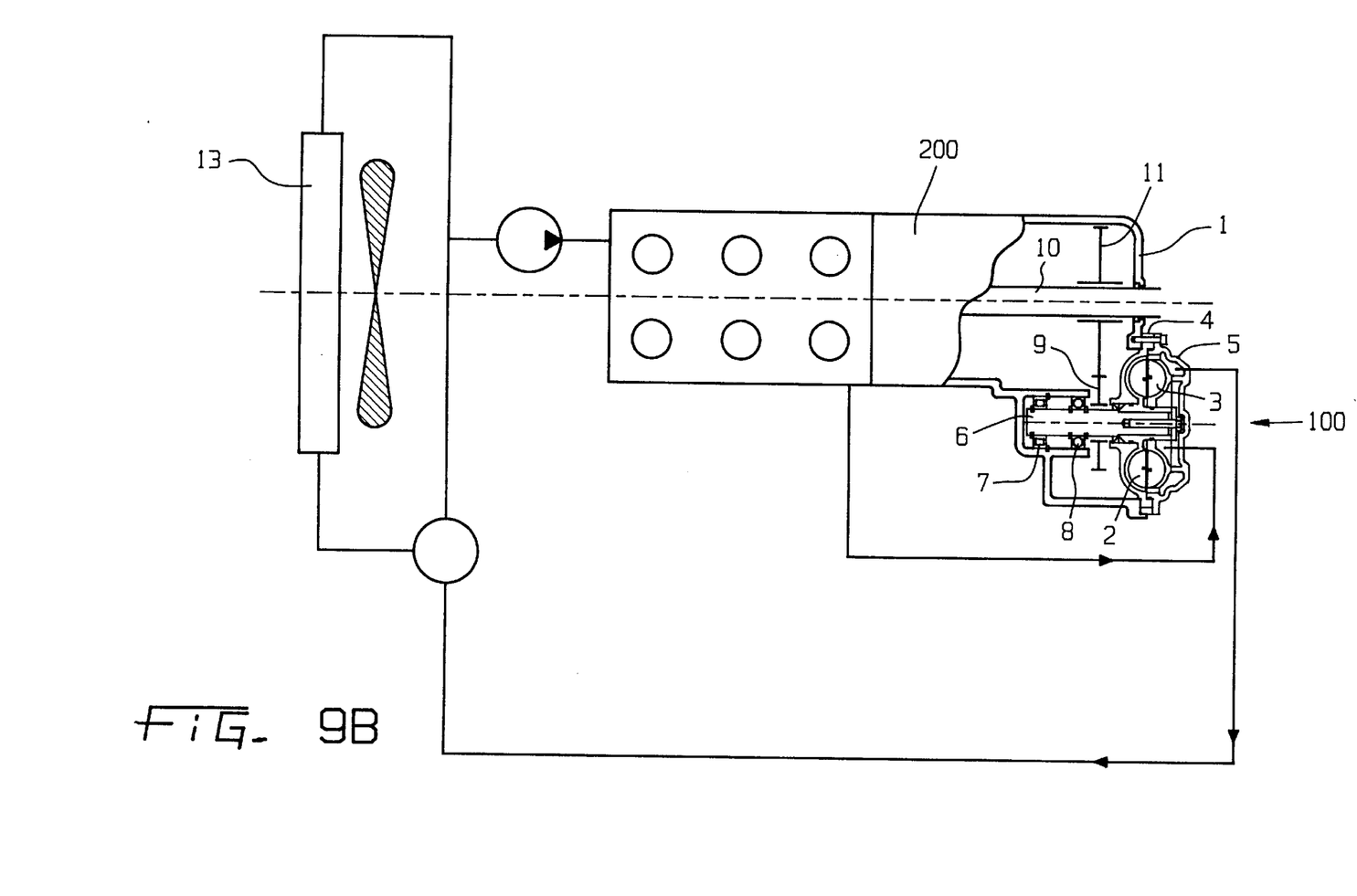

FIG. 9a shows an embodiment similar to FIG. 5a in a braking operation wherein the pinion 9 is mounted in floating fashion on the retarder side. FIG. 9b shows an embodiment similar to FIG. 9a, but with bearings 7 and 8 positionally switched.

Figure 10:
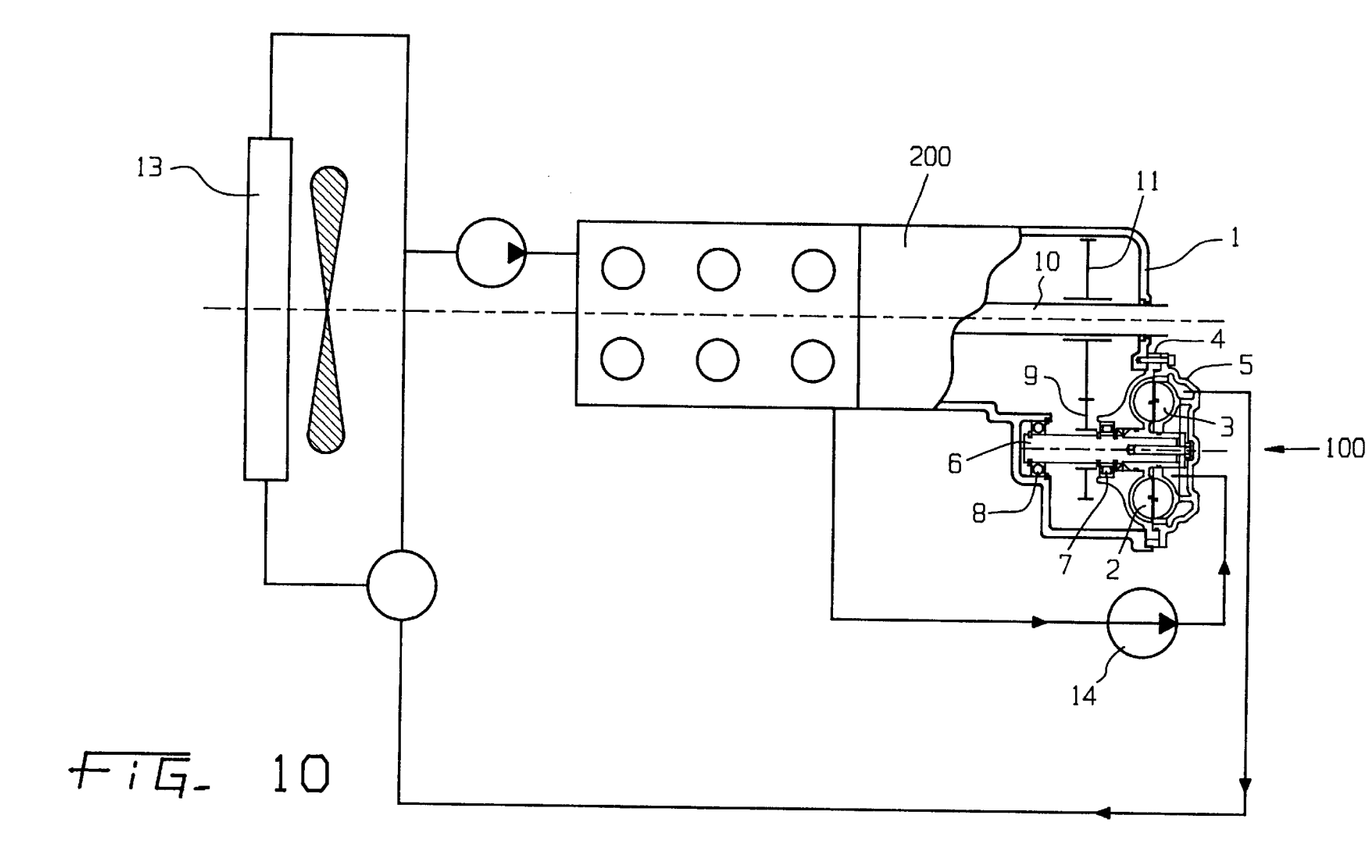
FIG. 10 is a schematic illustration of an embodiment corresponding to FIG. 5 with an additional feed pump integrated with the retarder assembly.

FIG. 10 schematically illustrates an embodiment similar to FIG. 5 wherein an additional coolant pump 14 is arranged on rotor impeller wheel shaft 6 or on a separate shaft. The additional pump provides additional support to the coolant pump arranged on the engine side during braking operations. The configuration of FIG. 10 makes the coolant flow during braking operations dependent on speed, i.e., the coolant flowrate can be increased at high speeds, thereby achieving a higher cooling capacity for the retarder cooling system than the configuration illustrated in FIG. 5a. For the configuration of FIG. 10, the arrangement of pinion 9 and the mounting configuration of the rotor impeller wheel shaft can take various forms as described above.

The arrangement and mounting of the rotor impeller wheel shaft in a position parallel to the transmission shaft, preferably the transmission output shaft, can take numerous other forms. Provision of a rotor impeller wheel which is parallel to the transmission shaft and which may be uncoupled therefrom is at the discretion of the expert.

What is claimed is:

1. A drive unit for a motor vehicle comprising:
   a drive train, said drive train having an engine and a transmission, said engine having an engine coolant and an engine coolant circuit for circulating said engine coolant; and
   a hydrodynamic retarder comprising:
      a stator impeller wheel; and
      a rotor impeller wheel which is driven by the drive train; said hydrodynamic retarder having said engine coolant as an operating medium, said hydrodynamic retarder arranged in series with said engine in said engine coolant circuit, said hydrodynamic retarder operatively connected to said drive train whereby said transmission is located between said engine and said hydrodynamic retarder on said drive train.

2. The drive unit of claim 1 further comprising:
   torque transmitting means for driving said rotor impeller wheel during braking operations; and
   uncoupling means for uncoupling said rotor impeller wheel from the drive train during nonbraking operations.

3. The drive unit of claim 1 further comprising a fluid feed pump operatively disposed in a feed line of the stator impeller wheel.

4. The drive unit of claim 1 wherein said hydrodynamic retarder is driven by a shaft forming a branch line powered by the drive train.

5. The drive unit of claim 1 further comprising:
   a rotor impeller wheel shaft which is disposed approximately parallel to the drive train, said rotor impeller wheel being mounted on said rotor impeller wheel shaft;

a pinion rotationally fixed to said rotor impeller wheel shaft;

a gear complementary to said pinion, said gear being rotationally engagable with a shaft of said drive train, whereby said gear transmits torque from said drive train to said pinion; and clutch means for interrupting said torque transmission.

6. The drive unit of claim 5 wherein said clutch means comprises a spline upon which said gear is axially slidable.

7. The drive unit of claim 5 wherein said clutch means comprises a spline upon which said pinion is axially slidable.

8. The drive unit of claim 1 further comprising:

a rotor impeller wheel shaft which is disposed approximately parallel to the drive train, said rotor impeller wheel being mounted on said rotor impeller wheel shaft between an unsupported end of said rotor impeller wheel shaft and a rotor impeller wheel shaft bearing nearest said unsupported end;

a pinion disposed on said rotor impeller wheel shaft, said pinion and said rotor impeller wheel shaft being rotationally engagable;

a gear complementary to said pinion, said gear being rotationally engagable with a shaft of said drive train; and clutch means for meshing and separating said gear and said pinion, whereby torque is selectively transmitted from said drive train to said rotor impeller shaft.

9. The drive unit of claim 1 wherein said rotor impeller wheel is mounted on said rotor impeller wheel shaft between an unsupported end of said rotor impeller wheel shaft and a rotor impeller wheel shaft bearing nearest said unsupported end.

10. The drive unit of claim 1 wherein said hydrodynamic retarder comprises an independent assembly which is operatively connected to the drive train.

11. The drive unit of claim 1 wherein said hydrodynamic retarder is disposed within a housing for the transmission.

12. The drive unit of claim 11 further comprising:

a rotor impeller wheel housing which bears upon the transmission housing, said rotor impeller wheel being disposed within the rotor impeller wheel housing;

a rotor impeller wheel shaft upon which the rotor impeller wheel is mounted;

a first bearing through which said rotor impeller wheel shaft radially bears upon the transmission housing; and a second bearing through which said rotor impeller wheel shaft radially and axially bears upon said rotor impeller wheel housing.

13. The drive unit of claim 11 further comprising:

a rotor impeller wheel housing which bears upon the transmission housing, said rotor impeller wheel being disposed within said rotor impeller wheel housing;

a rotor impeller wheel shaft upon which the rotor impeller wheel is mounted;

a first bearing through which said rotor impeller wheel shaft radially and axially bears upon the transmission housing; and a second bearing through which said rotor impeller wheel shaft radially bears upon said rotor impeller wheel housing.

14. The drive unit of claim 11 further comprising:

a rotor impeller wheel shaft upon which the rotor impeller wheel is mounted;

a pinion mounted upon said rotor impeller wheel shaft; and bearing means for mounting said rotor impeller wheel shaft to the vehicle, said bearing means disposed adjacent said rotor impeller wheel shaft between said pinion and said rotor impeller wheel.

15. The drive unit of claim 11 further comprising:

a rotor impeller wheel shaft upon which the rotor impeller wheel is mounted;

bearing means for mounting said rotor impeller wheel shaft to the vehicle; and a pinion mounted upon said rotor impeller wheel shaft, said pinion mounted on said rotor impeller wheel shaft between said bearing means and said rotor impeller wheel.

16. The drive unit of claim 1 further comprising:

a rotor impeller wheel shaft which is disposed approximately parallel to the drive train, said rotor impeller wheel being mounted on said rotor impeller wheel shaft;

a gear rotationally fixed to said rotor impeller wheel shaft;

a pinion complementary to said gear, said pinion being rotationally engagable with a shaft of said drive train, whereby said pinion transmits torque from said drive train to said gear; and clutch means for interrupting said torque transmission.

17. The drive unit of claim 1 further comprising a rotationally fixed connection between said impeller wheel and a shaft of the drive train.

* * * * *